United States Patent
Guo et al.

(10) Patent No.: US 11,388,209 B2
(45) Date of Patent: Jul. 12, 2022

(54) INTERACTIVE BROADCAST

(71) Applicant: DTEN, Inc., San Jose, CA (US)

(72) Inventors: Jin Guo, San Jose, CA (US); Wei Liu, San Jose, CA (US); Sally Tung, San Jose, CA (US)

(73) Assignee: DTEN, INC., San Jose, CA (US)

( * ) Notice: Subject to any disclaimer, the term of this patent is extended or adjusted under 35 U.S.C. 154(b) by 59 days.

(21) Appl. No.: 16/997,345

(22) Filed: Aug. 19, 2020

(65) Prior Publication Data

US 2021/0297467 A1 Sep. 23, 2021

Related U.S. Application Data

(60) Provisional application No. 62/991,837, filed on Mar. 19, 2020.

(51) Int. Cl.
| | |
|---|---|
| *H04L 65/403* | (2022.01) |
| *G06F 3/14* | (2006.01) |
| *H04L 65/401* | (2022.01) |
| *G06V 40/10* | (2022.01) |
| *G06V 40/20* | (2022.01) |

(52) U.S. Cl.
CPC ........ *H04L 65/4046* (2013.01); *G06F 3/1454* (2013.01); *G06V 40/113* (2022.01); *G06V 40/28* (2022.01); *H04L 65/4015* (2013.01)

(58) Field of Classification Search
CPC ............. H04L 65/4046; H04L 65/4015; H04L 65/403; H04L 29/06414; H04L 29/06421; H04L 29/06428; H04L 29/06435; G06F 3/1454; G09G 2340/0492; G09G 2354/00; G06V 40/113; G06V 40/28; G06V 40/107; G06V 40/11
See application file for complete search history.

(56) References Cited

U.S. PATENT DOCUMENTS

| | | | | |
|---|---|---|---|---|
| 7,769,810 | B1 * | 8/2010 | Kaufman | G06F 16/176 |
| | | | | 709/205 |
| 10,013,137 | B2 * | 7/2018 | Nancke-Krogh | G06F 3/0481 |
| 2010/0174783 | A1 * | 7/2010 | Zarom | H04L 65/403 |
| | | | | 709/205 |
| 2011/0252339 | A1 * | 10/2011 | Lemonik | G06F 40/166 |
| | | | | 715/753 |
| 2013/0151940 | A1 * | 6/2013 | Bailor | G06F 16/27 |
| | | | | 715/229 |

(Continued)

FOREIGN PATENT DOCUMENTS

EP 3367690 A1 * 8/2018 ........... G02B 27/017

*Primary Examiner* — Kieu D Vu
*Assistant Examiner* — Blaine T Basom
(74) *Attorney, Agent, or Firm* — Lempia Summerfield Katz LLC (57) ABSTRACT

A system controls an electronic device in a teleconferencing system through remote screen-receiving devices that access software applications on a screen-sending device. Access is provided through a point-to-point private wireless network. The software applications are replicated on the remote screen-receiving devices. The software allows users of the remote screen-receiving device to simultaneously manipulate or use one or more common software applications. The concurrent manipulation or use occurs without the screen-sending device applying a software application locking.

20 Claims, 6 Drawing Sheets

(56) References Cited

U.S. PATENT DOCUMENTS

| | | | |
|---|---|---|---|
| 2013/0210353 A1* | 8/2013 | Ling | H04W 4/80 |
| | | | 455/41.1 |
| 2014/0269389 A1* | 9/2014 | Bukkfejes | G01S 3/48 |
| | | | 370/252 |
| 2015/0019694 A1* | 1/2015 | Feng | G06F 3/1462 |
| | | | 709/219 |
| 2015/0200979 A1* | 7/2015 | Huang | G06F 3/0482 |
| | | | 715/753 |
| 2017/0024100 A1* | 1/2017 | Pieper | H04L 65/80 |
| 2017/0318260 A1* | 11/2017 | Torres | H04L 65/403 |
| 2020/0409469 A1* | 12/2020 | Kannan | G06V 30/274 |

\* cited by examiner

INTERACTIVE BROADCAST

PRIORITY CLAIM

This application claims the benefit of priority from U.S. Provisional Application No. 62/991,837, filed Mar. 19, 2020, titled "Interactive Broadcast", which is herein incorporated by reference.

BACKGROUND OF THE DISCLOSURE

Technical Field

This patent application relates to application software, and specifically to an interactive system that supports unconstrained concurrent interactions.

Related Art

Software applications generally allow participants to interact on systems that typically serve single users. Single user applications serve these users and run in a mode that only allow the user to see his or her own interactions. A multi-user application allows local and remote users to see their interactions on one system. Typically, response times are long because of the interaction times and delays in processing each of the participant's input.

In some multi-user applications, the consistency of an interaction is not assured or mediated. Further, the output of a remote operation can cause significant screen transition delays especially when viewport windows vary between devices or different applications are accessed from remote devices.

DETAILED DESCRIPTION

An interactive broadcast system and process (referred to as a system or systems) maximize responsiveness of an interaction on sending devices and receiving devices, while coordinating and validating interactions. The systems mediate inconsistencies by running agent systems on local and remote devices that coordinate active and/or inactive software applications resident to the sending devices and replicated on the receiving devices. The sending devices respond to request-response exchanges from replicated software applications on the receiving devices to provide access to software applications and ensure distributed control.

In some systems, communication is localized, meaning that one or more screen-sending devices unitary with a teleconferencing system and the one or more screen-receiving devices communicate through a private short-range wireless network (e.g., a network that transmits in a range of about 10 to about 50 meters). It does not require a publicly accessible connection. In these systems, wireless networks constantly broadcast radio signals to nearby screen-receiving devices that automatically pair with one screen-sending device. The screen-receiving devices can display and access the software applications resident to the screen-sending device without changing the background and foreground display order rendered on and by the screen-sending device.

Some systems provide screen mirroring between primary nodes and replicated nodes that allow remote users to view different and/or other content from the local users and the remote and/or mobile users. This means users may access different aspects and content of a meeting facilitated by the teleconferencing systems by accessing active and inactive software applications (also referred to as applications) managed and served by one or more screen-sending devices. A meeting may focus on an aspect displayed locally in the foreground of a screen-sending device while remote or mobile users interact with different aspects of software resident to the background of the screen-sending device. The different software or the associated user interfaces may not be displayed locally on the screen-sending device. Thus, remote and mobile users can access different software applications whether they are active and/or their interfaces are rendered in the foreground on the displays of the screen-sending device or are inactive and/or rendered in the background of the screen-sending device. The software applications are managed by the screen-sending devices without interrupting or changing the viewport of the local display and collaboration occurring locally on the screen-sending node.

In some systems, the content and application sharing occur through a point-to-point private and/or encrypted network connection, ensuring that the data is never exposed to intermediate devices, intruders, or other persons and entities that access publicly accessible networks. The screen-sending devices and screen sharing devices may be restricted to small physical areas such as a conference room or a meeting room that generally serves singular events such as business conferences and meetings.

In operation, the systems facilitate users to share input simultaneously and freely at any time that facilitates a natural flow of information. The systems provide similar user interfaces that promote cooperative work and interactive responses. Some protocol sharing avoid display locking events and software application-level locking events that prevent conflicts from occurring by locking displays and/or software applications when a user is interacting with a display and/or software application locally or remotely. By replicating the software applications at the screen-receiving and the screen-sending devices and executing a control protocol, each user can view use and/or manipulate any display, software application, control, and/or common viewport locally or remotely at any time and propagate those changes at synchronization intervals to the other devices as if they are operating a single user device.

While some systems operate through a taking-turns approach that serve multiple users via a serial execution (e.g., controlled by timing); alternate systems are not constrained to serial executions as conflicts are mediated by timing control and priority assignments. In some alternate systems, the screen-receiving devices optimize performance by performing tasks before it is known if the tasks are needed (e.g., performing software application commands on the screen-receiving devices in the background) via a speculative execution, so as to prevent a delay that would have incurred by executing the tasks after it is known that the tasks are need. If the tasks are determined not to be needed, any changes caused by their execution may be reverted, and the intermediate results flowing from them discarded.

Figure 1:
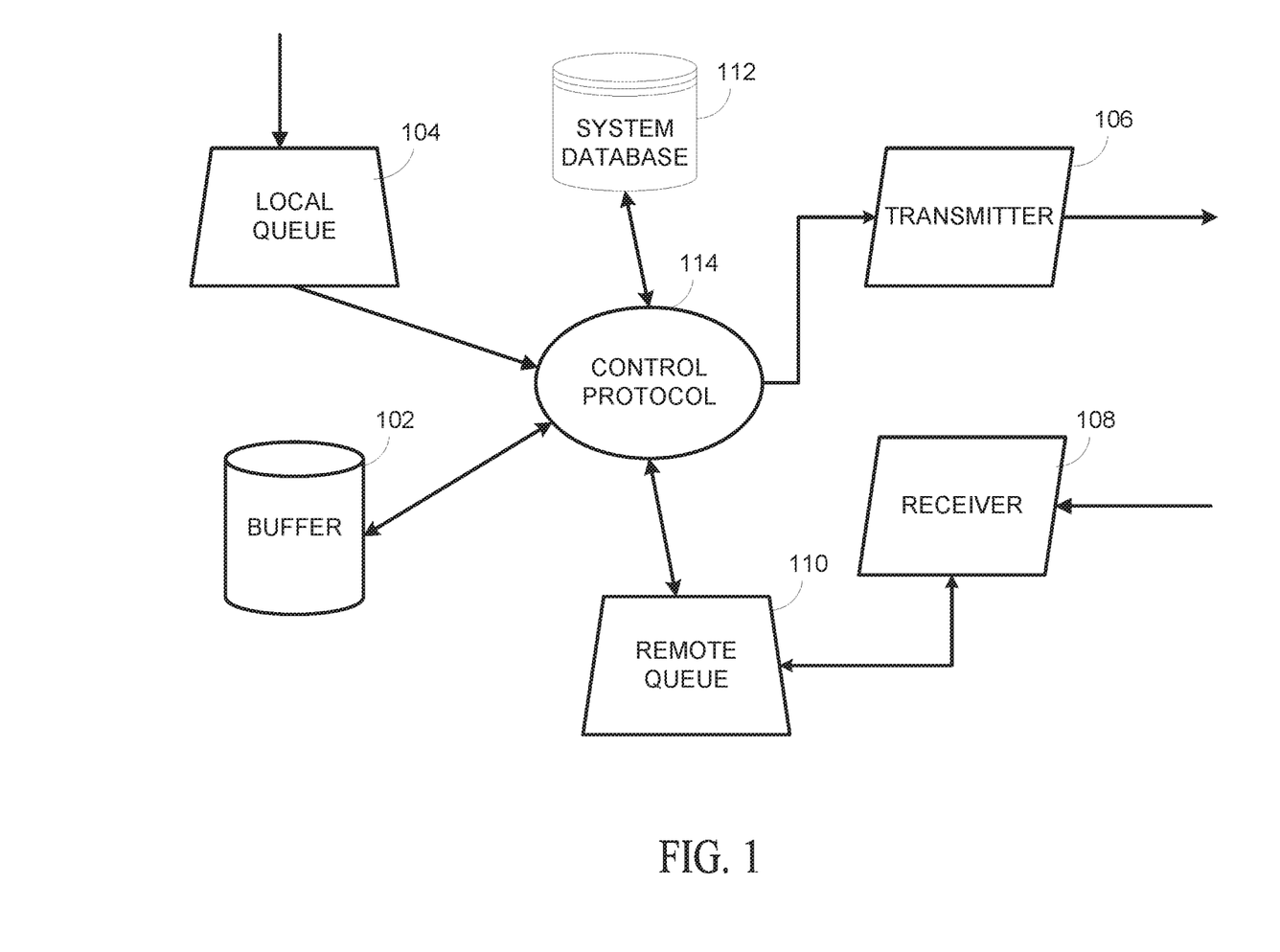
FIG. 1 is a software application sharing architecture.
Figure 3:
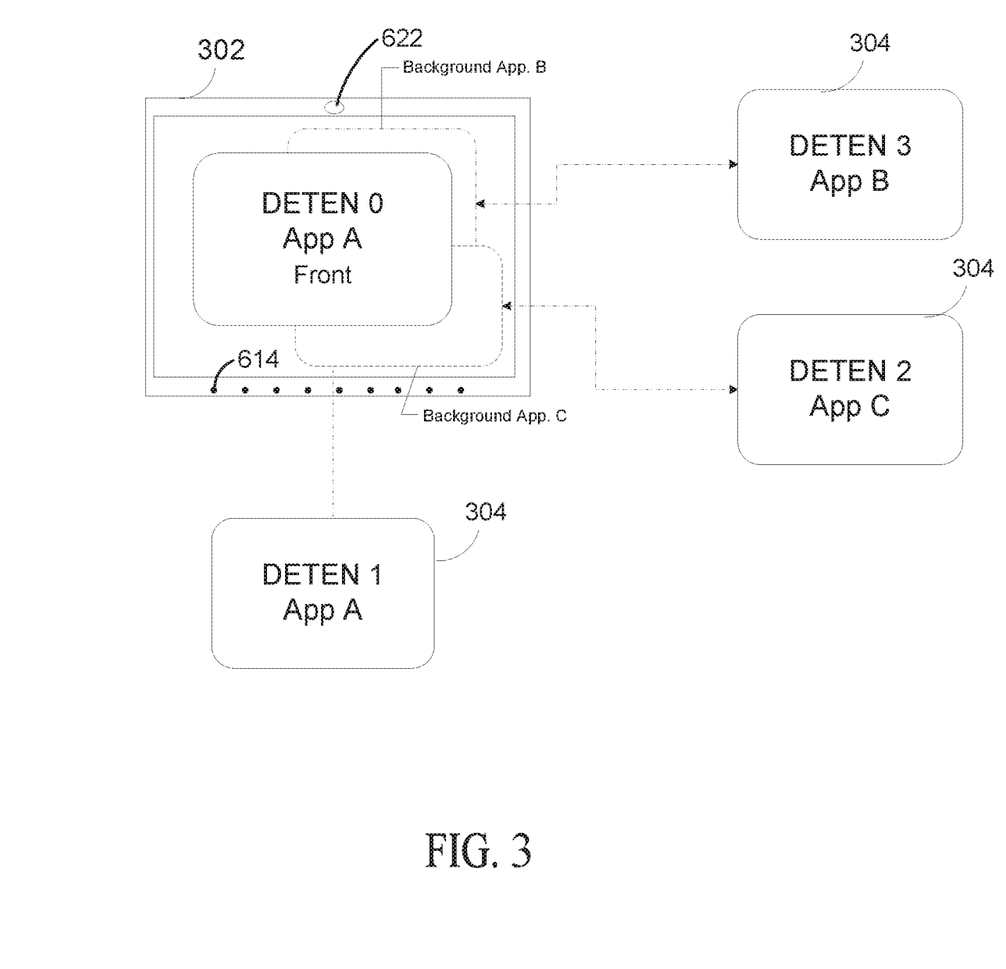
FIG. 3 show screen-sending devices wirelessly connected to screen-receiving devices.

As shown in FIG. 1 or 3, each screen-sending device 302 and screen receiving device 104 or node may retain software applications or replications and their state information in an operations buffer 102. The systems further include a local queue 104 that logs local operations, a wireless transmitter 106, a wireless receiver 108, and a remote queue 110 that logs remote operations. Each screen sending device further maintains a system database 112 for storing local and remote operations objects and interactions that update the state of the application.

In some systems, changes are propagated at a granular level. When overlapping or related actions or commands occur, state differences are derived as each local operation is executed and are transmitted automatically at synchronization intervals to the controlling screen-sending devices 302. When conflicts occur, some systems mediate differences at the controlling screen-sending device 302 based on timing (e.g., the command first received controls through a first-in, first-out protocol or a FIFO queue), or according to an assigned priority established at the controlling screen-sending device. The assigned priority can be pre-defined or assigned by a user through a user portal such as a Web portal that assigns device and/or user access rights and/or restrictions through user and/or device profiles stored in the system database 112 that may also establish precedence when inconsistent commands or operations are requested.

The use of different levels of priority provide a means in which many different types of potential conflicts, clashes, and disruptions are avoided. On some systems, the assigned priorities can determine when, how long, and/or how often a device may control another device, and in alternate systems, allow messages and/or commands to be assigned priorities that determine how soon and/or when the messages may be transmitted to a receiving device.

Figure 2:
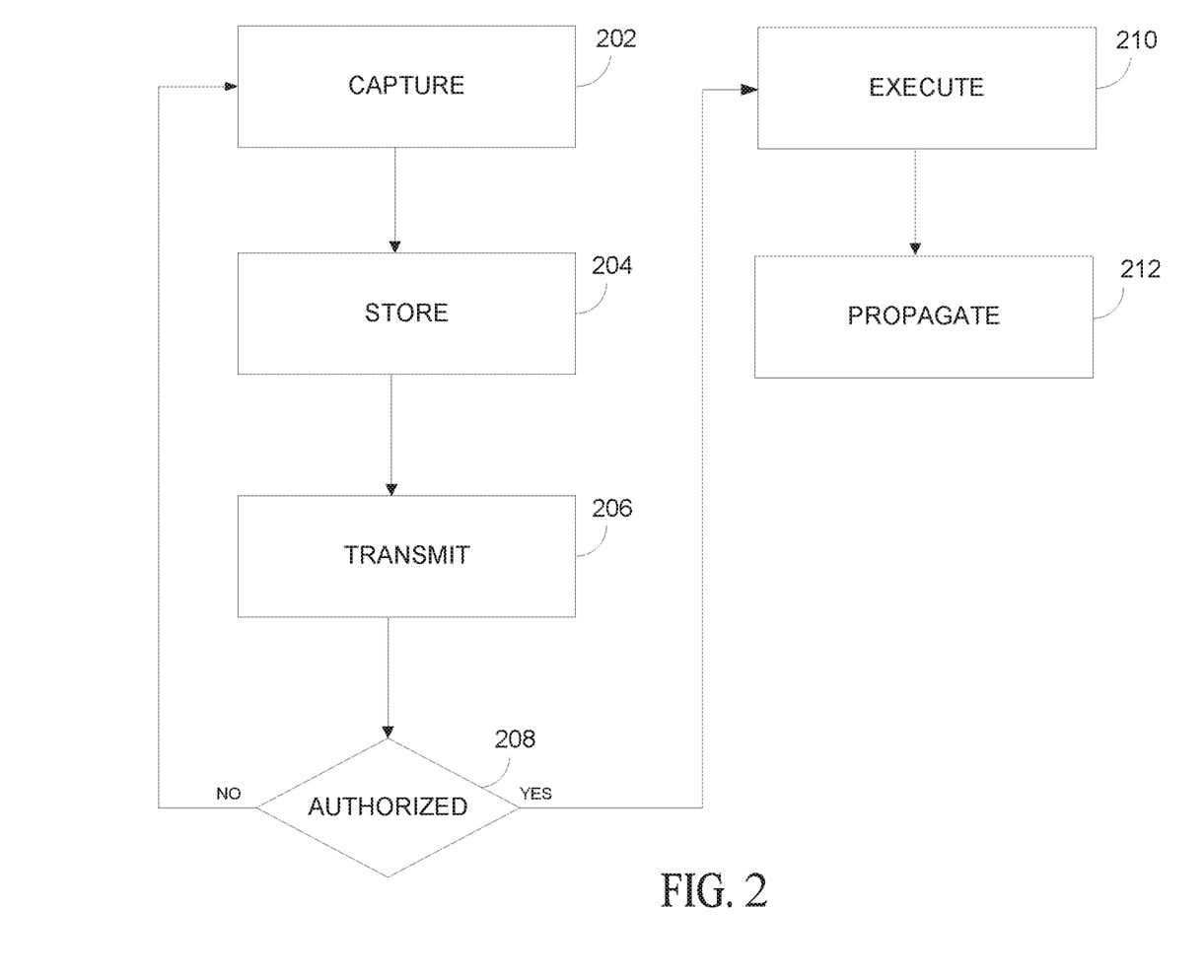
FIG. 2 is a software application sharing process.

In operation, agents running a control protocol are executed on each of the screen-sending and the screen-receiving devices. With respect to FIGS. 1-3, interactive applications operating on the primary nodes (the screen-sending device 302) are duplicated on the replicated nodes (screen-receiving device 304). When an interaction or command (referred to as an interaction object) occurs via a software application of an active screen-receiving device 304, a software agent captures the interaction at 202 and stores the object in a local queue 104 or deque as a state-changing event candidate object at 204. The queue 104 is a multi-element data structure stored in a memory in which objects are removed from one end or both ends by the order in which they were inserted (e.g., FIFO) or based on other factors such as, for example, a priority designation assigned to the inserted objects. When a state-changing event candidate object is stored in the local queue at 204, the agent (via the control protocol 114) transmits (via its transmitter 106) at 206 the requested interaction or command via the state-changing event candidate object to the controlling screen-sending device 302 (the primary node), that is received by a receiver 108 and stored in the screen-sending device's remote queue 110. If authorized at 208 by user rights and/or the device's access rights, the interaction or control is executed at the controlling screen-sending device 302 at 210 is stored in the system database 112 and concurrently propagated to each of the screen-receiving devices 304 (the replicated nodes) at 212 to effect a cross-functional control. The changes are received by the receivers 108 and stored in each of the remote queues 110 of the screen-receiving devices 304. At the screen-receiving devices 304, the changes update each of the respective buffers 102 to a current state of the controlling screen-sending device 302 which reflects the state change of the controlling screen-sending device 302.

Some screen-receiving devices 304 view, control, and/or modify specific software application based on granted permissions. In some systems, the permissions are established in user and/or device profiles stored in the screen-sending device system database 112. A set of rules may govern whether the user is allowed access to one or more software applications in some systems, and generally establish rules that the user and/or device must comply with while using the system to maintain access privileges. Authorization may set up by a system administrator and verified by the portal based on a user identification and validation. In some systems, access to primary nodes (screen-sending device 302) made through the replicated nodes (the screen-receiving devices 304) does not change the viewport order rendered by the primary nodes. Thus, when a command, interaction, and/or state change is requested in a software application or its user interface rendered in the background or on an inactive application of the screen-sending device 302, the operation may be executed on the screen-sending device 302 in the background without changing the position order and location of that software application or its interface rendered on the screen-sending device 302 or change the active/inactive status on the screen-sending device 302 once the operation is executed. Due to the remote locality and background control granted to the screen-receiving devices 304, the change can occur without executing frequent viewport switching on the screen-sending device 302. With respect to FIG. 3, software applications "B" and "C" remain in the background of the screen-sending device 302, while application "A" remain in the foreground of the screen-sending device 302 even when accessed by the screen-receiving devices DTEN1 304, DTEN2 304, and DTEN3 304, respectively. Generally, a viewport comprises a view or display of the software application or its user interface visible to the local user in proximity to the screen-sending device's display 610.

In some systems, software applications on the screen-sending devices 302 are accessed directly by the screen-receiving devices 304. In alternate systems, access to the software applications occur via the replicated software applications at the (remote) replicated nodes (the screen-receiving devices 304) through a speculative execution, which are thereafter transmitted, reconciled, and synchronized at the primary nodes (the screen-sending devices 302) based on a time order received at the primary nodes (the screen-sending devices 302) and the authorizations and permissions granted in the user and/or device profiles. This alternate system reduce repetitive modifications of the accessed software applications at the screen-sending device 302 as multiple modifications are reconciled prior to execution at the at the screen-sending device 302 and propagations to the screen-receiving devices 304.

In the disclosed systems, the screen-receiving devices 302 initiate contact with the screen-sending devices 302 to make use of the application software resident to the screen-sending devices 302. The devices that make use of software application on screen-sending devices 302 may function as screen-sending devices 302 when the devices provide access to software or other services to devices on the network. Further, the devices that provide access to software applications to screen-receiving devices 304 may function as screen-receiving devices 304 when the devices make use of software applications served by other devices.

In some systems a touchless user interface provides a natural and intuitive technology that enables all users to communicate with the screen-sending and screen receiving devices 302 and 304. The systems enable users to control these devices without requiring hand-held devices or keyboards. The systems are immediately accessible and some provide visual cues of gesture-message control associations. Employing hand gesture recognitions and upper limb recognitions the systems enable multiple forms of natural human communication.

Figure 4:
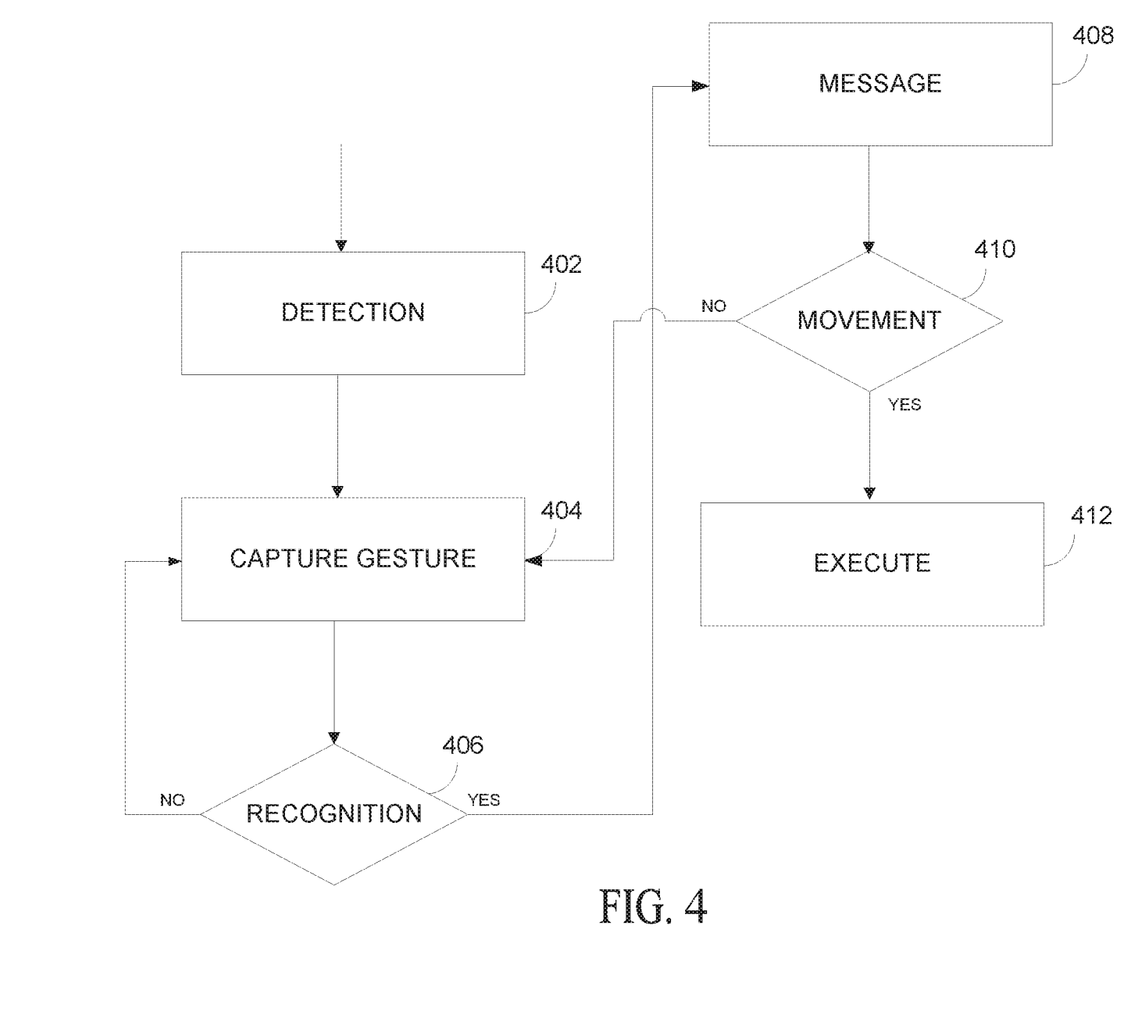
FIG. 4 is a touchless interface process used in the software application sharing architecture.
Figure 5:
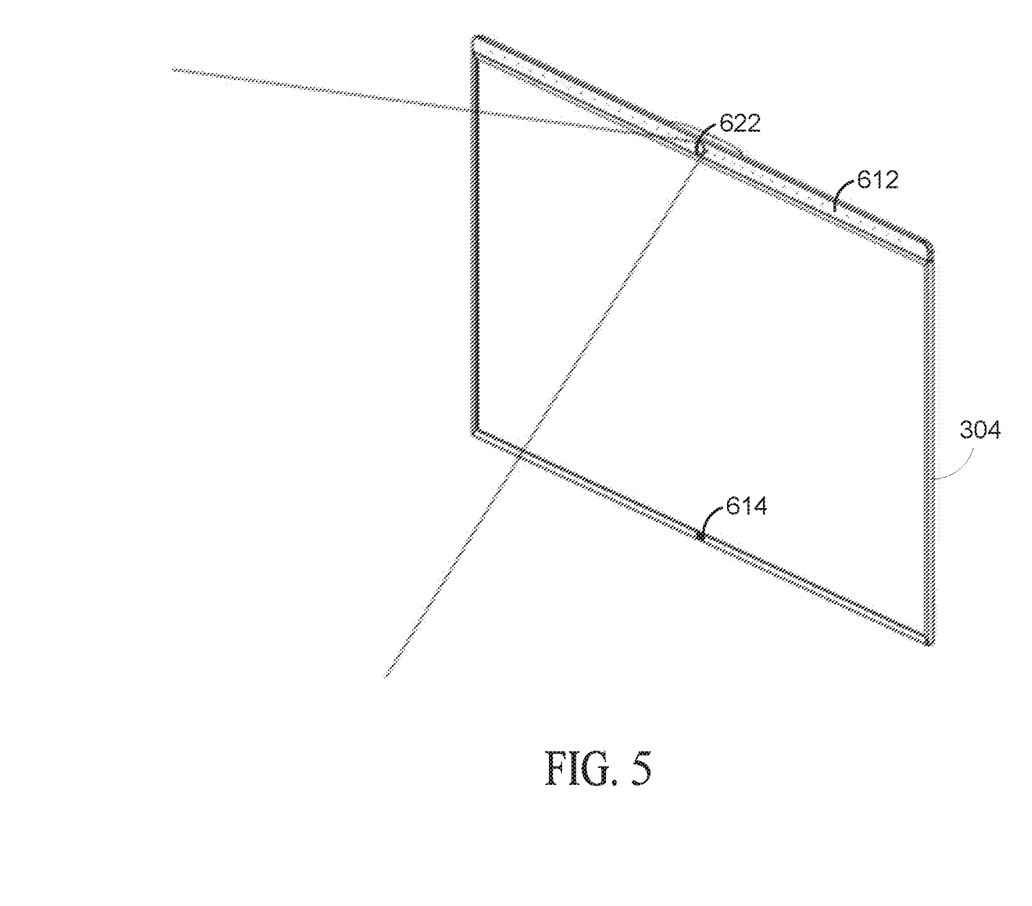
FIG. 5 is an exemplary screen-receiving device.

With the system in an interactive state, the touchless user interface on the screen-sending and/or screen receiving devices 302 and/or 304 recognizes a predetermined number of captured gestures that imitate natural communications as shown in FIG. 4. A gesture such as raising a single finger from an occluded hand in a virtual interaction area detected and captured by a camera on the screen-sending and/or screen-receiving devices 302 and/or 304 at 402 and 404. When recognized at 406 the touchless user interface causes a message center on the devices 302 and/or 304 to render a message and the movement of the finger at 112 causes a message center 626 to execute the message when the movement occurs within a predetermined time interval. An execution of a message encompass an execution of functionality associated with or linked to a message such as an execution of a desired action or control of a software application, for example. The message may be a list of options from which a user makes a selection from a software application, which causes the remote device to perform a desired action (e.g., an execution), such as initiating a command or causing the software application to execute a function. In an exemplary system, the gesture is the input recognized by the system that causes a rendering of a message and the gesture's movement causes the execution and/or transmission of the message by the screen-sending device 302.

Unlike some systems, gesture recognition does not occur only in response to movements (e.g., a hand, finger, or body movement). Instead, there are static recognition events, such as unique hand-shape recognitions of an occluded hand and extended finger, for example, and dynamic hand-shape recognition events that results in the recognition of a movement, and/or the trajectory of the movement that results in an execution of the message. At both recognition events, feedback is provided in some systems. In response to a successful static recognition event, a message is rendered that may be executed by a gesture movement (e.g., a dynamic recognition event). In response to a successful dynamic recognition, a message execution occurs such as the execution of an action associated with the message (e.g., actuating a program, a transmission of information and/or etc.).

In some systems, a fixed number of static and/or dynamic gestures are recognized at the screen-sending and/or screen receiving devices; in other systems, a plurality of gestures are recognized. Some may be customized by a user such as the systems described in 62/900,232 titled Gesture Control Systems, which is herein incorporated by reference. In these systems, feedback is provided to the user to confirm the correctness of a recognized interaction at the screen-sending and/or screen-receiving device 302 and/or 304 the user is interacting with. The screen-sending and/or screen receiving devices 302 and/or 304 may prevent or inhibit one or more predetermined actions or tasks from being carried out when the static and/or dynamic gestures are not recognized such as a gesture that is not part of a recognition lexicon stored in a memory. It may prevent a desired action if not recognized for example.

To improve responsiveness, some functionality of the systems loads dynamic gesture-shape recognition event software applications in the background before a successful dynamic recognition events occur. In these systems, the systems begin to load the dynamic execution functionality when the execution of a recognition event begins. If the recognition event is unsuccessful or terminated, the system terminates the loading of the dynamic recognition event software applications that renders the dynamic execution functionality and awaits the capture of another gesture. If the static recognition event is successful and a dynamic recognition event is completed, the functionality in the system completes an interaction execution with no delay. If the dynamic recognition event is terminated or not completed, the systems terminate or suspends the interaction's execution until a successful recognition event occurs.

In some systems, the lexicon used to control applications rely on movements in place of or in addition to recognitions. A predefined gesture such as the movement or position of a an appendage, for example, executes a command via an alternate recognition event. The screen-sending and/or screen receiving devices require only a single camera 626. In alternate systems, two or more cameras 626 are used to improve the accuracy of the detections and the measure of respective gesture movement and/or trajectory.

Figure 6:
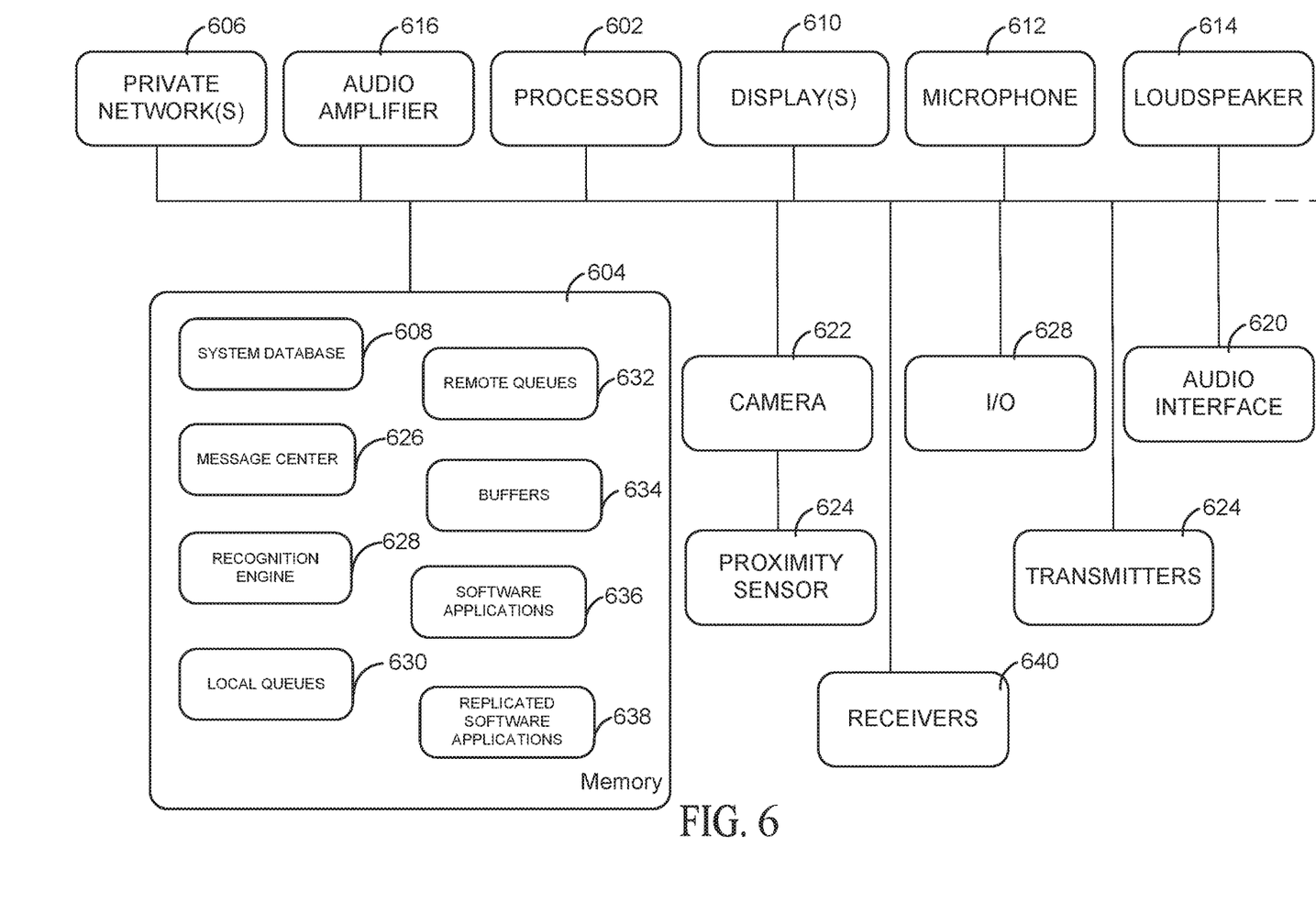
FIG. 6 is an alternate software application sharing architecture.

FIG. 6 is a block diagram of systems that may execute the process flows, functions, and systems described above and those shown in FIGS. 1-5. The system comprises a processor unit or graphical processor unit 602, a non-transitory media such as a memory 604 (the contents of which are accessible by one or more processors and/or graphical processors 602), a private network 606, a system database 608, displays 610, microphone array 612, loudspeakers 614, audio amplifiers 616, audio interfaces 620, one or more cameras 622, transmitters 624, receivers 640, a message center 626, and an I/O interface 628. The I/O interface 628 connects devices and local and/or replicated remote software applications such as, for example, on the screen-sending and/or screen-receiving devices 302 and/or 304. The memory 604 stores instructions, which when executed by the processor 602, causes the system to render some or all of the functionality associated with interactive broadcasting and control. The memory 604 stores instructions, which when executed by the processor 602, causes the system to automatically render functionality and hardware that enables interactive broadcasting and recognition events (e.g., via the recognition engines 628), local queues 630, remote queues 632, buffers 634, software applications 636, and replicated software applications 638. In yet another alternate system, the non-transitory media provided functionality is provided entirely or partially through cloud storage. The term cloud storage is intended to broadly encompass hardware and software that enables data to be maintained, managed, and backed up remotely and made available to users over a network. In this system, cloud storage provides ubiquitous access to the system's resources that can be rapidly provisioned over a private network. Cloud storage allows for the sharing of resources to achieve coherence services.

The memory 604 and/or storage disclosed may retain an ordered listing of executable instructions for implementing the functions described above in a non-transitory computer code. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM or Flash memory), or a database management system. The memory 604 may comprise a single device or multiple devices that may be disposed on one or more dedicated memory devices or disposed on a processor or other similar device. The term "engine" is intended to broadly encompass a processor or a portion of a program that executes or supports events such as the static and dynamic events and processes. When functions, steps, etc. are said to be "responsive to" or occur "in response to" another function or step, etc., the functions or steps necessarily occur as a result of another function or step, etc. It is not sufficient that a function or act merely follow or occur subsequent to another. The term "substantially" or "about" encompasses a range that is largely, but not necessarily wholly, what is specified. It encompasses all but an insignificant amount, such as the values disclosed and/or a variance within a range of five to ten percent of the given value or range.

Alternate systems are not limited to the particular hardware and process described above. The systems illustratively disclosed herein suitably may be practiced in the absence of any element (including hardware and/or software), which is not specifically disclosed herein. They may operate in the absence of those elements. Further, the various elements described in each of the many systems described herein is regarded as divisible with regard to the individual elements described, rather than inseparable as a whole. In other words, alternate systems encompass any variation and combinations of elements described herein and may be made or used without the various elements described (e.g., they may operate in the absence of one or more of the disclosed elements).

An interactive broadcast system and process maximize responsiveness of an interaction on sending devices 302 and receiving devices 304, while coordinating and validating interactions. The systems mediate inconsistencies by running agent systems on local and remote devices that coordinate active and/or inactive applications resident to the sending devices 302 and replicated on the receiving devices 304. The sending devices respond to request-response exchanges from replicated software applications on the receiving devices to provide content sharing and distributed control.

The systems provide screen mirroring between primary nodes and replicated nodes that allow remote users to view different and/or other content from local users and the remote and/or mobile users. The systems allow users to access different aspects and content of a meeting by accessing active and inactive software applications managed and served by one or more screen-sending devices 302. The software applications are managed by the screen-sending devices 302 without changing or interrupting the local display sourced by the screen-sending node and the collaboration occurring on the screen-sending node. In some systems, communication is localized, meaning the one or more screen-sending devices 302 and the one or more screen-receiving devices 302 communicate through a short-range wireless connection such as through a beacon unitary to the one or more screen-sending devices 302. The beacons provide a local WIFI and/or Bluetooth connection that does not require a publicly accessible connection like the Internet. In these systems, the screen-sending devices 302 share resources, content, and application software with the screen-receiving devices 304.

The subject-matter of the disclosure may also relate, among others, to the following aspects (the aspects are referenced by numbers):

1. A computer implemented method of controlling an electronic device in a teleconferencing system, comprising:
   providing access to software applications on a screen-sending device;
   accessing the software applications through a plurality of remote screen-receiving devices through a point-to-point private wireless network;
   where the software applications are replicated on the plurality of remote screen-receiving devices which allow a plurality of users of the plurality of remote screen-receiving device to manipulate the software concurrently without the screen-sending device applying a software application locking.

2. The computer implemented method of aspect 1 where the screen-sending device is a unitary part of a teleconferencing system.

3. The computer implemented method of any of aspects of 1 to 2, where the users manipulate the software concurrently through a queue.

4. The computer implemented method of aspect 3 further comprising propagating changes to the software applications replicated on the plurality of remote screen-receiving devices at synchronization intervals.

5. The computer implemented method of aspect 3 where the screen-receiving devices perform a speculative execution.

6. The computer implemented method of aspect 5 where the queue operates in a first-in, first out protocol.

7. The computer implemented method of any of aspects of 1 to 6 where the point-to-point private wireless network has a transmission range of about 10 to about 50 meters.

8. The computer implemented method of any of aspects of 1 to 7 where interfaces to the software applications are resident in a foreground and background on a display of the screen-sending device.

9. The computer implemented method of any of aspects of 1 to 8 where access to the interfaces to the software applications do not change positional orders on a display and an associated viewport.

10. The computer implemented method of any of aspects of 1 to 9 where conflicts between the plurality of remote screen-receiving devices are reconciled based on a timing and a pre-assigned priority.

11. A method of controlling an electronic device in a teleconferencing system, comprising:
    providing access to software applications on a screen-sending device;
    accessing the software applications through a plurality of remote screen-receiving devices through a point-to-point private wireless network;
    where the software applications are replicated on the plurality of remote screen-receiving devices which allow a plurality of users of the plurality of remote screen-receiving device to manipulate the software concurrently without the screen-sending device applying a software application locking.

12. The computer implemented method of aspect 11 where the screen-sending device is a unitary part of a teleconferencing system.

13. The computer implemented method of any of aspects of 11 to 12, where the users manipulate the software concurrently through a queue.

14. The computer implemented method of aspect 13 further comprising propagating changes to the software applications replicated on the plurality of remote screen-receiving devices at synchronization intervals.

15. The computer implemented method of aspect 13 where the screen-receiving devices via a speculative execution.

16. The computer implemented method of aspect 15 where the queue operates in a first-in, first out protocol.

17. The computer implemented method of any of aspects of 11 to 16 where the point-to-point private wireless network has a transmission range of about 10 to about 50 meters.

18. The computer implemented method of any of aspects of 11 to 17 where interfaces to the software applications are resident in a foreground and background on a display of the screen-sending device.

19. The computer implemented method of any of aspects of 11 to 18 where access to the interfaces to the software applications do not change positional orders on a display and an associated viewport.

20. The computer implemented method of any of aspects of 11 to 19 where conflicts between the plurality of remote screen-receiving devices are reconciled based on a timing and a pre-assigned priority.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A computer implemented method of controlling an electronic device in a teleconferencing system, comprising:
    accessing a non-transitory machine-readable medium encoded with machine-executable instructions, wherein execution of the machine-executable instructions is for:
    providing access to software applications on a screen-sending device;
    accessing the software applications through a plurality of remote screen-receiving devices through a point-to-point private wireless network;
    assigning a priority to at least one of the plurality of remote screen-receiving devices that establishes when and how often the at least one of the plurality of screen-receiving devices controls the screen-sending device and establishes when a message may be transmitted to the at least one of the plurality of remote screen-receiving devices;
    transmitting from the at least one of the plurality of remote screen-receiving devices, state differences to the screen-sending device automatically when a local operation executed by the at least one of the plurality of remote screen-receiving devices conflicts with a command propagated by the screen-sending device to the at least one of the plurality of remote screen-receiving devices;
        detecting an extended finger by processing a comparison of an image of the extended finger captured by a camera against a plurality of images stored in a memory;
        where the detecting further comprises predicting a bounding box defined by four coordinates that is used to extract the image of the extended finger captured by the camera by:
        generating a predicted object score of the bounding box;
        determining if the object score exceeds a predetermined threshold; and
        extracting a feature of the image of the extended finger by executing a plurality of convolutional layers successively until a predetermined error is reached to render an identification;
    executing the local command at the at least one of the plurality of remote screen-receiving devices in response to the detecting; and
    returning the at least one of the plurality of remote screen-receiving devices to a former state by reverting the local operation at the at least one of the plurality of remote screen-receiving devices and discarding changes caused by the local operation executed by the at least one of the plurality of remote screen-receiving devices;
    where the software applications are replicated on the plurality of remote screen-receiving devices which allow a plurality of users of the plurality of remote screen-receiving devices to manipulate the software applications concurrently without the screen-sending device applying a software application locking.

2. The computer implemented method of claim 1 where the screen-sending device is a unitary part of a teleconferencing system.

3. The computer implemented method of claim 1, where the users manipulate the software applications concurrently through a queue.

4. The computer implemented method of claim 3 further comprising propagating changes to the software applications replicated on the plurality of remote screen-receiving devices at synchronization intervals.

5. The computer implemented method of claim 3 where the screen-receiving devices perform a speculative execution.

6. The computer implemented method of claim 5 where the queue operates in a first-in, first out protocol.

7. The computer implemented method of claim 1 where the point-to-point private wireless network has a transmission range of 10 to 50 meters.

8. The computer implemented method of claim 1 where a plurality of interfaces to the software applications are resident in a foreground and background on a display of the screen-sending device.

9. The computer implemented method of claim 1 where access to a plurality of interfaces to the software applications do not change positional orders on a display and an associated viewport.

10. The computer implemented method of claim 1 where conflicts between the plurality of remote screen-receiving devices are reconciled based on a timing and a pre-assigned priority.

11. A method of controlling an electronic device in a teleconferencing system, comprising:
    providing access to software applications on a screen-sending device;
    accessing the software applications through a plurality of remote screen-receiving devices through a network;
    assigning device access rights through device profiles to each of the plurality of remote screen-receiving devices that establish when and how often each of the plurality of screen-receiving devices controls the screen-sending device and establishes when a message may be transmitted to the plurality of screen-receiving devices, respectively;
    transmitting from at least one of the plurality of remote screen-receiving devices, state differences to the screen-sending device automatically when a local command executed by the at least one of the plurality of remote screen-receiving devices conflicts with commands propagated by the screen-sending device;

detecting an extended finger by processing a comparison of an image of the extended finger captured by a camera against a plurality of images stored in a memory;

where the detecting further comprises predicting a bounding box defined by four coordinates that is used to extract the image of the extended finger captured by the camera by:

generating a predicted object score of the bounding box;

determining if the object score exceeds a predetermined threshold; and extracting a feature of the image of the extended finger by executing a plurality of convolutional layers successively until a predetermined error is reached to render an identification;

executing the local command at the at least one of the plurality of remote screen-receiving devices in response to the detecting; and returning the at least one of the plurality of remote screen-receiving devices to a former state by reverting the local command at the at least one of the plurality of remote screen-receiving devices and discarding changes caused by the local command executed by the at least one of the plurality of remote screen-receiving devices;

where the software applications are replicated on the plurality of remote screen-receiving devices which allow a plurality of users of the plurality of remote screen-receiving devices to manipulate the software applications concurrently without the screen-sending device applying a software application locking.

12. The method of claim 11 where the screen-sending device is a unitary part of a teleconferencing system.

13. The method of claim 11, where the users manipulate the software applications concurrently through a queue.

14. The method of claim 13 further comprising propagating changes to the software applications replicated on the plurality of remote screen-receiving devices at synchronization intervals.

15. The method of claim 13 where the screen-receiving devices operates via a speculative execution.

16. The method of claim 15 where the queue operates in a first-in, first out protocol.

17. The method of claim 11 where the network comprises a point-to-point private wireless network that has a transmission range of 10 to 50 meters.

18. The method of claim 11 where a plurality of interfaces to the software applications are resident in a foreground and background on a display of the screen-sending device.

19. The method of claim 11 where access to a plurality of interfaces to the software applications do not change positional orders on a display and an associated viewport.

20. The method of claim 11 where conflicts between the plurality of remote screen-receiving devices are reconciled based on a timing and a pre-assigned priority.

* * * * *